(12) United States Patent
Boersma

(10) Patent No.: US 6,202,928 B1
(45) Date of Patent: Mar. 20, 2001

(54) OPTICAL DEVICE FOR READING AND DECODING A BARCODE

(75) Inventor: Gerrit Boersma, Odijk (NL)

(73) Assignee: Scantech B.V. (NL)

( * ) Notice: Subject to any disclaimer, the term of this patent is extended or adjusted under 35 U.S.C. 154(b) by 0 days.

(21) Appl. No.: 09/247,267

(22) Filed: Feb. 10, 1999

(30) Foreign Application Priority Data

Feb. 10, 1998 (NL) .................................................. 1008260

(51) Int. Cl.$^7$ ...................................................... G06K 7/10
(52) U.S. Cl. .............................. 235/462.1; 235/462.25; 235/462.26; 235/462.27
(58) Field of Search ........................... 235/462.1, 462.25, 235/462.26, 462.27

(56) References Cited

U.S. PATENT DOCUMENTS

| | | | |
|---|---|---|---|
| 4,740,675 | 4/1988 | Brosnan et al. | 235/462.25 X |
| 5,298,728 | 3/1994 | Elliott et al. | 235/462.25 X |
| 5,502,311 | * 3/1996 | Imai et al. | 250/548 |
| 5,581,072 | 12/1996 | Bridgelall et al. | 235/462.25 X |
| 5,631,457 | * 5/1997 | Fukuda et al. | 235/462.1 X |
| 5,675,136 | * 10/1997 | Keinath et al. | 235/454 X |

FOREIGN PATENT DOCUMENTS

0661661A1    7/1995   (EP) .

* cited by examiner

*Primary Examiner*—Michael G Lee
(74) *Attorney, Agent, or Firm*—Webb Ziesenheim Logsdon Orkin & Hanson, P.C.

(57) ABSTRACT

An optional device for reading and decoding bars of different reflectivity arranged in accordance with a barcode and adjoining one another. The device includes an optical scanning device for scanning the bars by a light beam, a sensor for receiving the reflected light beam and converting the latter into an electrical sensor output signal, a transition detector for detecting the level transitions of the electrical sensor output signal and a decoding device which decodes the scanned barcode on the basis of the output signals from the transition detector. The sensor output signal is fed to an amplitude averaging device and/or contrast averaging device, the output of which is connected to a decision device which controls the decoding device in such a way that reading and decoding of the barcode is carried out several times if the output signal from the amplitude averaging device and/or contrast averaging device is below at least a predetermined threshold value.

12 Claims, 3 Drawing Sheets

OPTICAL DEVICE FOR READING AND DECODING A BARCODE

BACKGROUND OF THE INVENTION

The invention relates to an optical device for reading and decoding bars of different reflectivity arranged in accordance with a barcode and adjoining one another, comprising an optical scanning device for scanning the bars by means of a light beam, a sensor for receiving the reflected light beam and converting the latter into an electrical sensor output signal, a transition detector for detecting the level transitions of the electrical sensor output signal and a decoding device which decodes the scanned barcode on the basis of the output signals from the transition detector.

A device of this type, which is also termed a laser scanner, is generally known.

With such a laser scanner a laser beam (for example originating from a semi-conductor laser with a wavelength of 670 nm) is directed onto a scan pattern generator. The scan pattern generator controls the laser beam in such a way that a pattern of sequential scan lines is written over a surface to which a barcode has been applied.

A small proportion of the light scattered by the barcode reaches a sensor, for example in the form of a photodiode, via a scan system, which operates in the reverse manner to the scan pattern generator, and via a collector lens. A laser spot moving linearly over the barcode is produced and after reflection from the barcode and after incidence on the sensor an electrical signal is generated at the output of the sensor, which signal varies as a function of time in accordance with the barcode. Two digital signals are derived from said electrical sensor output signal, the one digital signal indicating the points in time at which a transition from light to dark takes place, whilst the other signal indicates the points in time of the transitions from dark to light. Decoding of the barcode is then carried out in a digital processor. The result is fed in the form of a row of characters to the microncontroller. A microcontroller also performs a number of checks (for example check numeral) and determines whether the result is good or not. In the former case the good result is sent to the main computer (for example the till), accompanied by a "bleep" and a LED light signal. A microcontroller manages the entire process and also has a number of supplementary tasks.

The path from the sensor to the decoding unit plays a crucial role in the quality of the scanner. The signal received is usually very small and is then close to the noise. This occurs especially in the case of a large read distance and with barcodes which have a poor contrast. Close up and with good contrast, on the other hand, the signal can be very strong.

For safety reasons the strength of the laser light may not be high. Furthermore, the time between two transitions varies with the scanning distance and the barcode density. Taking account of the minimum and maximum distance and the maximum and minimum barcode density, a frequency range can be defined within which it must be possible to detect. An appreciable improvement is already achieved by filtering out this range.

The aim of the invention is to provide an optical device of the type mentioned in the preamble with which the reliability is even further improved, including in the case of a low signal-to-noise ratio when scanning, in a simple manner and with few components. Furthermore, the aim is as far as possible to prevent possible codes which result from noise, the so-called "ghost reads".

The U.S. Pat. Nos. 5,298,728; 5,581,072 and 4,740,675 disclose an analog processor for a laser scanner. In said patents mainly the methods are discussed for offering data as well as possible to the decoder of the scanner. This is not the subject matter of this patent application. In this patent application it is suggested and solutions are given to keep the number of rescanning as low as possible while improvement of misread performance is maintained.

The European patent application 0 661 661 describes a CCD scanner with a fixed barcode position. More than one scan is always carried out. The decoder of the scanner does not produce a position of a good result per se, but only indicates that if there are more equal results these results will be the correct one. In other words the majority decides. This is a very poor solution and only one scan will never be sufficient. In said European patent application the distinction between good and poor barcodes is not emphasized.

A barcode is omnidirectionally positioned, i.e. position and orientation vary. This means also that scan data originate from scan lines having mutually different angles, so that the scan data as offered to the decoder are not comparable on that level, c.f. for example European patent application 0 661 661.

Light reflected from the barcode is received by the sensor and converted in an electrical signal. In the subsequent analog processor a first pulse train is derived from that electrical signal, which pulse train indicates the moment of occurrence of a transition of black to white. Also a second pulse train is produced, which indicates the moments on which a transition of white to black takes place. In several prior art scanners a signal (jam signal) is delivered, which indicates that a white area a long duration has been found (advance area to the barcode).

The above-mentioned digital outputs of the analog processor are fed to the decoder, consisting of a ASIC and a microprocessor. Said decoder decides whether the barcode is good or not. If the decoder decides that the barcode is good, the produced date is transmitted to the HOST and a positive signal is delivered.

In several prior art apparatus a parameter is used, which could be set externally (called COUNT). The decoder must decide to a good result if at least a number of results has been found, which number is equal to the number indicated by COUNT.

It could happen that a sufficient number of scans enter during the intake of scan information, so that an eventually COUNT>1 is met. But is the barcode is kept marginally in the scan area it could happen that only data of one complete scan has been received. If COUNT=2 has been set a rescan must be carried out. That stagnates. Consequently, the COUNT=1 is preferred. This could be sufficient in many circumstances if the decoder operates sufficiently critical. However, when the barcode print is poor, a difficult barcode colour is used or the distance to the barcode is large, the information applied to the decoder could be such that the decoder decides that a good barcode is received, whereas this decision is not correct. Then it is spoken of as a misread which is a severe condition.

In view of above circumstances a further aim of the invention is to have only a higher COUNT in troublesome conditions.

SUMMARY OF THE INVENTION

According to a first aspect of the invention, said aim is achieved in that the sensor output signal is fed to an amplitude averaging device, the output of which is connected to a decision device which controls the decoding device in such a way that reading and decoding of the barcode is carried out several times if the output signal from the amplitude averaging device is below at least a predetermined threshold value.

According to a second aspect, the aim is achieved in that the sensor output signal is fed to a contrast averaging device, the output of which is connected to a decision device which controls the decoding device in such a way that reading and decoding of the barcode is carried out several times if the output signal from the contrast averaging device is below at least a predetermined threshold value.

According to the invention information concerning averaged amplitude and/or contrast is fetched from the analog processor and this is fed to the decoder. Based on said information a higher number of good results can be required. If this could b realised based on the available scan data the above-mentioned selection can be carried out without this is observed by the user. If this is not the case, a rescan should be carried out; but this is only limited to the relevant cases.

Reliability is thus improved because the average contrast value or average amplitude value of the entire barcode is determined and is fed to the decision device. The decision device decides that if one or both of the abovementioned values is/are below a certain threshold value it is not sufficient to obtain a single good scanning result but a repeatedly identical result has to be found.

BRIEF DESCRIPTION OF THE DRAWINGS

Embodiments which are preferably to be used are described in the dependent claims.

The invention will be explained in more detail below with reference to the drawings.

In the drawings:

FIG. 1 shows a block diagram of a detector and decoding device according to the invention for a laser scanner;

FIG. 2 shows a block diagram of an embodiment of an amplitude averaging device in FIG. 1;

FIG. 3 shows a block diagram of an embodiment of a contrast averaging device in FIG. 1;

FIG. 4 shows a block diagram of another embodiment of a detector and decoding device according to the invention;

FIG. 5 shows an embodiment of a window detector and amplitude determination;

FIG. 6 shows an embodiment of a differentiator and contrast determination from FIG. 4; and FIG. 7 shows an embodiment of a peak detector according to the invention

DESCRIPTION OF THE PREFERRED EMBODIMENT

In a known laser scanner for scanning and reading a barcode, a fixed line pattern is written with a laser beam by means of a system of lenses and mirrors, including mirrors which are attached to the shaft of a motor and rotate therewith. When the laser beam impinges on an object, for example a barcode, some of the light is reflected diffusely. Some of this reflected light is projected by means of a system of lenses and mirrors, which operates in the converse manner, onto a sensor, for example in the form of a photodiode. In the last-mentioned system of lenses and mirrors, use is largely made of the abovementioned mirrors which are used to generate the scanning line pattern, including the rotary mirrors. The quantity of light which impinges on the sensor at a given point in time is thus a measure of the reflectivity of the object at the location of the laser spot.

The optical scanning device which has been briefly described above is generally known and the invention is more particularly aimed at the received portion of the reflected light. Therefore, it can suffice here to refer to the prior art for the implementation of the scanning device.

Figure 1:
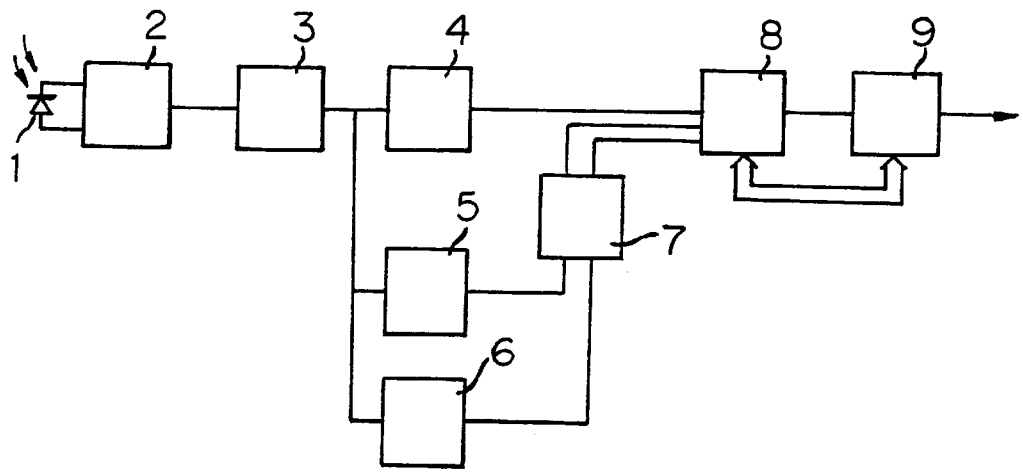

A block diagram of an embodiment of a detector device and decoding device according to the invention is shown in FIG. 1. The light beam reflected by the barcode which is incident on the sensor 1 is converted by said sensor or photodiode 1 into an electrical signal, said sensor output signal being a function of the quantity of light which has been received by the sensor. Said sensor output signal is amplified, if appropriate, and converted into an electrical voltage in the preamplifier 2. The subsequent bandpass filter 3 filters those frequencies out of the spectrum which contain no useful information for decoding barcodes.

As a result of the use of the bandpass filter, the signal-to-noise ratio of the signal obtained is improved and the barcode can be relatively reliably decoded from the filtered sensor signal.

The filtered sensor signal from the bandpass filter 3 is fed to the transition detector 4 for detection of the level transitions of the barcode from the filtered sensor output signal. The output signals from the transition detector, which represent the level transitions from light to dark and from dark to light, respectively, are fed to the decoding device 8, which decodes said signals to give a barcode. A microprocessor 9 calls up the decoded codes from the decoding device 8 and is responsible for further processing thereof and control of other components of the laser scanner and communication with a till system.

The device for detecting and decoding barcodes which has been described up to now has generally known functions. Said device has the disadvantage that after decoding a code it is not always possible reliably to establish whether this code has been obtained from clear analogue signals or that the code has been derived from a weak signal or noise with the errors associated with this.

In order to overcome said disadvantage, according to the invention with the embodiment shown in FIG. 1 the sensor output signal is fed, preferably after amplification in the preamplifier 2 and after filtering in the bandpass filter 3, to an amplitude averaging device 5. The amplitude of the sensor output signal is determined and averaged in said device and the averaged value is fed to the decision device 7. Said decision device 7 controls the decoding device in such a way that decoding of the barcode is carried out several times if the output signal from the amplitude averaging devices is below at least a pre-determined threshold value.

With the embodiment according to the invention shown in FIG. 1, the sensor output signal is also fed to a contrast averaging device 6, the output of which is fed to the decision device 7. Said decision device controls the decoding device in such a way that reading and decoding of the barcode is carried out several times if the output signal from the contrast averaging device is below at least a predetermined threshold value.

In this context "contrast" is understood to mean the speed of change between the various levels in a barcode. The contrast could, for example, be determined in the contrast averaging device 6 on the basis of the first derivative of the sensor output signal fed to the contrast averaging device. The contrast value is then averaged and compared with at least one threshold value.

A code which has been coded from a signal with a small amplitude and/or a low contrast is decoded more frequently according to the invention than is a code from a clear signal. The code is considered to be sufficiently reliable only when a number of identical coding results approved by the system have been determined, which number is dependent on, for example, the magnitude of the amplitude and/or the contrast. If the reliability criterion in this example has been met, the correct coding result is supplied to the till system. In this way even codes which have a small amplitude and/or low contrast can be read reliably without this being at the cost of the "first read rate" of the scanner for clear barcodes.

Although in general there is a relationship between the amplitude and the contrast of a barcode, the availability of the combination certainly adds something to this. Thus, for example, a barcode which is located relatively far away from the scanner and therefore emits a weak signal can nevertheless have clear transitions and thus a good contrast. The various aspects depend on the print quality of the code and on the focusing of the laser spot. The selection of amplitude, contrast or the combination thereof can be made application-dependent. The amplitude and contrast values are, as it were, subjected to a function, for example a direct summation function, the value of the function being compared with a threshold value, optionally in addition to the application of the abovementioned reliability criteria. The selection possibilities can, for example, be implemented in the decision device.

In another embodiment, a number of values supplied by the amplitude averaging and/or contrast averaging devices can be summed and the two summation results can be compared separately with their own individual threshold value, optionally supplemented by a combination function.

It is also possible to define ranges of amplitude and contrast values, to which numbers are assigned, by means of a number of threshold values. If the amplitude or contrast values are within a range, the number of identical coding results must equal the number assigned to the range.

The selection of criteria is thus highly flexible.

Figure 2:
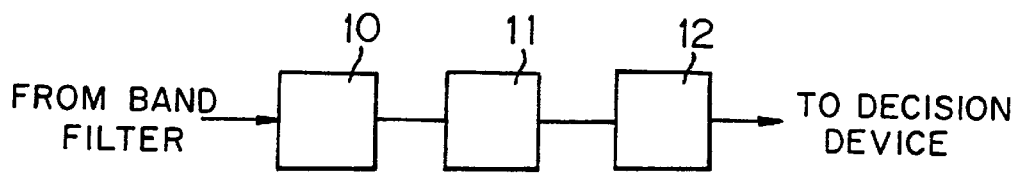

An embodiment of an amplitude averaging device is shown in FIG. 2.

The signal originating from the bandpass filter 3 is fed to the peak detector 10, the output of which is connected to the input of the low-pass filter 11. The output signal from the low-pass filter is a measure of the averaged value of the amplitude of the output signal from the bandpass filter 3. The output signal from the low-pass filter 11 is an analogue signal that can be fed to a decision device 7 constructed as an analogue device. Preferably, the output signal from the low-pass filter 11 is fed to an analogue-digital converter 12, the output signal of which is fed to the decision device 7, which in this case is constructed as a digital device.

Figure 3:
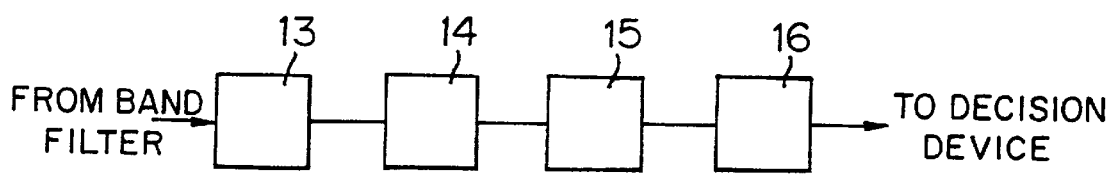

An example of a contrast averaging device is shown in FIG. 3.

The output signal from the bandpass filter 3 in FIG. 1 is fed to the differentiator 13, the output signal of which is applied to the input of the peak detector 14. The output signal from the peak detector 14 is a measure of the contrast of the sensor output signal and the output from the bandpass filter 3. The output signal from the peak detector 14 is averaged in the low-pass filter 15, the output signal of which is preferably fed to the analogue-digital converter 16. The digital output signal from said converter is then fed to the decision device 7, which is constructed as a digital device.

Figure 4:
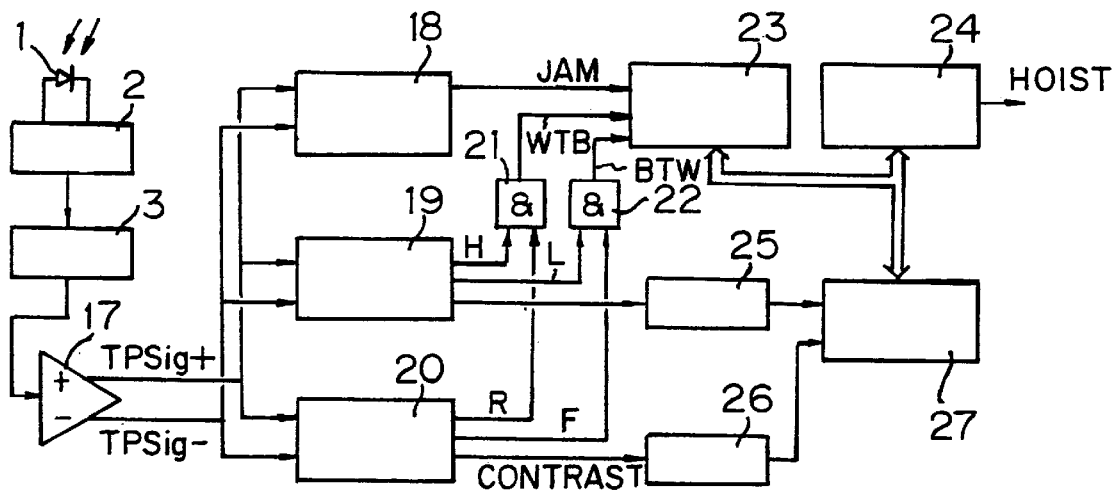

A block diagram of another embodiment of a detector and decoding device according to the invention is shown in FIG. 4. With this embodiment the sensor output signal from the sensor 1 is likewise fed through a preamplifier 2 and a bandpass filter 3.

The signal is then buffered using the operational amplifier 17. Said amplifier supplies a signal TPSig+ buffered on the + input thereof and also an inverted signal TPSig– that is buffered on the inverting – input.

the signals TPSig+ and TPSig– are fed to a so-called JAM detection circuit 18. Said detection circuit 18 emits a pulse at its output if there is a substantial increase in the contrast at a particular point in time, in which context there must be question of a transition from light to dark. This means that the laser spot has moved from a light margin onto a barcode and that the light margin therefore must not be interpreted as a space but clearly as a margin.

The signals TPSig+ and TPSig– are also fed to a transition detector which in the embodiment shown in FIG. 4 comprises a window detector 19 and a differentiator 20. By means of amplitude windows (thresholds), the window detector 19 selects time windows within which transitions from light to dark and vice versa can be expected. A transition from light to dark is indicated by the logic value 1 on the output H. The same applies correspondingly for the output L for transitions from dark to light. In other words, time windows are selected within which transitions from dark to light and vice versa can be expected. A logic value 1 on the output L of the window detector 6 is an indication that a transition from dark to light has occurred.

The differentiator 20 differentiates the signals TPSig+ and TPSig–, the derivatives thereof being determined. By this means the times of the transition from dark to light and vice versa are determined. If the derivative is positive, a logic one is produced on the output R of the differentiator and if the derivative is negative there is a logic one on the output F.

The output H of the window detector 19 is fed to one input of the AND gate 21 and the output R is connected to the other input thereof. The inputs of the AND gate 22 are connected to the output L of the window detector 19 and the output F of the differentiator 20. The AND gate 21 emits a pulse when there is a transition from light to dark and the gate 22 emits a pulse when there is a transition from dark to light. Signals wtb and btw are produced on the outputs of the AND gates 21 and 22, which signals indicate associated pulses at the transition times. Said signals wtb and btw are fed together with the signal jam from the JAM detector 18 to a decoding device 23 of a so-called ASIC, where decoding of the barcodes takes place.

A microprocessor 24 calls up the decoded codes from the decoding device 23 and is responsible for further processing thereof as well as control of the other components of the scanner and communication with a till system.

The window detector 19 is equipped to derive an instantaneous amplitude signal from the signals TPSig+ and TPSig−, which amplitude signal is fed to the low-pass filter 25.

The instantaneous contrast signal is derived by the differentiator 20 from the abovementioned signals and fed to the low-pass filter 26. It is pointed out that the instantaneous amplitude signal and the instantaneous contrast signal can also be derived in other ways. The outputs of the low-pass filters 25 and 26 are connected to the inputs of the AD converter 27. Said low-pass filters 25 and 26 are responsible for averaging the instantaneous amplitude signals and contrast signals, respectively. The microprocessor 24 reads the analogue-digital converter 23 immediately after the decoding device 10 has found a code and subsequently ensures that a code with a small amplitude and/or a low contrast has to be seen more frequently than a code from a clear signal before the code is passed to the till system.

Figure 5:
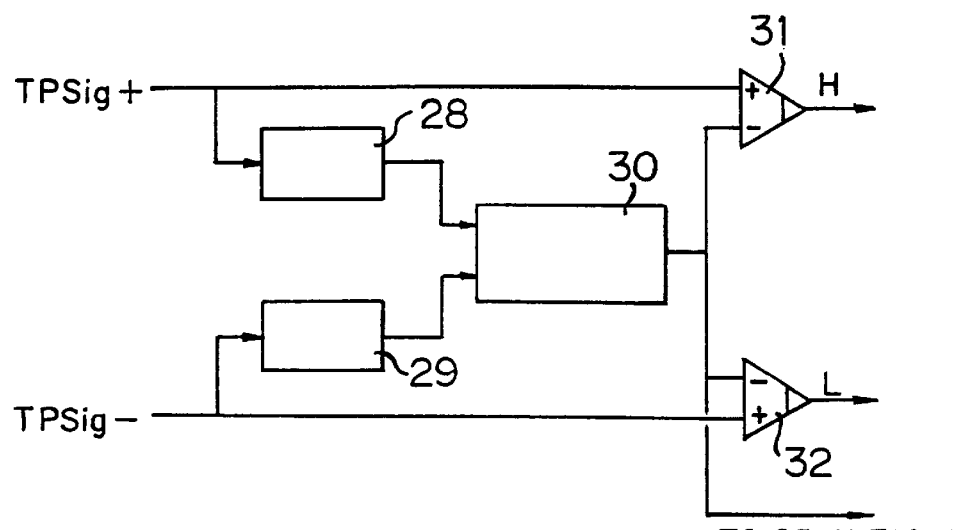

An example of the way in which the window detector 19 can be implemented and the way in which the instantaneous amplitude signal can be derived is illustrated in FIG. 5. According to FIG. 5, the window detector comprises the peak detectors 28 and 29, to which the sensor output signals TPSig+ and TPSig−, respectively, are fed. Said output signals are also fed to the plus inputs of the comparators 31 and 32, respectively. The outputs of the peak detectors 28 and 29 are connected to the inputs of a threshold value generator 30, the output of which is connected to the minus input of the comparators 31 and 32. The outputs of the comparators 31 and 32 correspond to the outputs H and L, respectively, of the window detector 19 in FIG. 4. The output of the peak detector 28, 29 immediately follows the input thereof if the level of the input is higher than that of the output. If, on the other hand, the input is lower, the level of the output than falls exponentially. The characteristic decay time is long compared with the time interval between two successive bars in a barcode and is short compared with the period which is needed to scan a line. In the threshold value generator 30 the levels supplied are averaged and divided by approximately a factor of 2 in order to obtain a threshold value. Depending on the circumstances, other threshold values are, of course, possible. The two comparators 31 and 32 ensure that the outputs H and L emit a pulse only if the signals TPSig+ and TPSig−, respectively, are above this threshold. This threshold prevents transitions being generated from noise with a relatively low amplitude. The instantaneous amplitude signal is taken off at the output of the threshold value generator 30 and fed to the low-pass filter 25 in FIG. 4.

Figure 6:
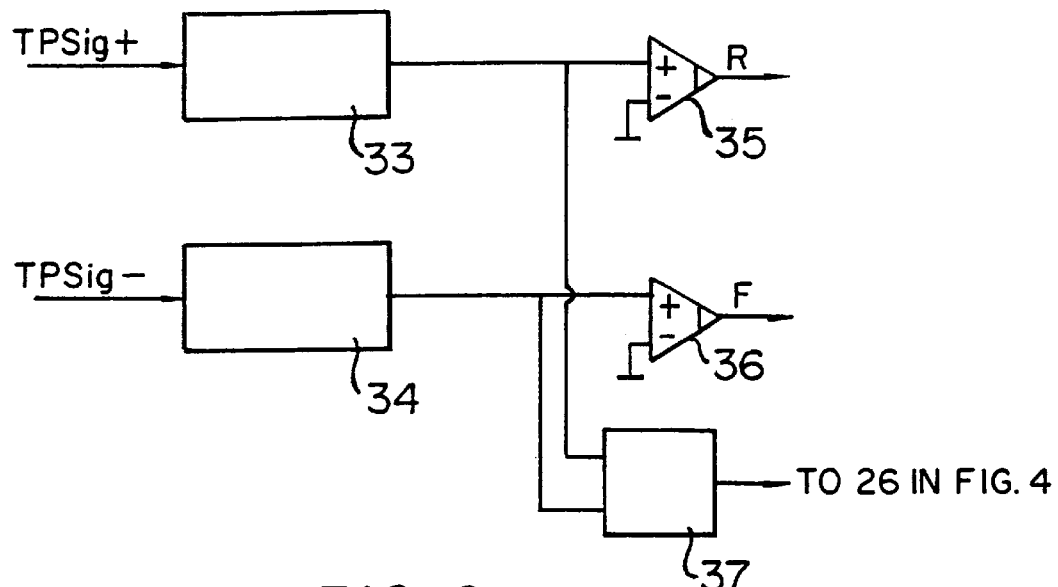

An example of one implementation of the differentiator 20 in FIG. 4 and a method for deriving the instantaneous contrast signal is illustrated in FIG. 6. The sensor signal TPSig+ is fed to the differentiation circuit 33 and the sensor signal TPSig− to the differentiation circuits 34, the outputs of which circuits are connected to the plus inputs of the comparators 35 and 36, respectively. The logic one signal appears on the output R and the logic zero signal on the output F, or vice versa, which outputs correspond to the outputs R and F of the differentiator 20 in FIG. 4. The instantaneous contrast signal is derived from the outputs of the differentiation circuits 33 and 34 by means of a peak detector 37. Said instantaneous contrast signal can then be fed to the input of the low-pass filter 26 in FIG. 4. By means of the comparators 35 and 36 it is determined whether there is question of a positive or a negative derivative, in other words the type of transition is determined.

Figure 7:
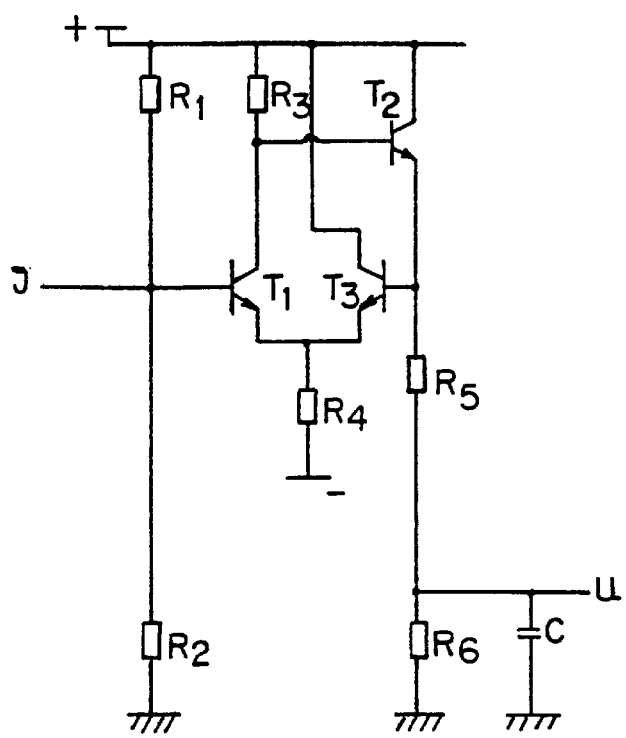

An example of a peak detector is illustrated in FIG. 7.

The input I of the peak detector is connected to the junction of the resistances R1 and R2, the other terminals of which are connected to a + potential and earth, respectively. The base of the transistor T1 is connected to said junction of the resistances R1 and R2. The collector of the transistor T1 is connected to the + potential via the resistance R3. The emitters of the transistors T1 and T3 are connected via the resistance R4 to a—potential.

The collector of the transistor T3 is connected to the + potential. The base of the transistor T2 is connected to the collector of the transistor T1, whilst the collector of the transistor T2 is connected to the + potential and the emitter thereof is connected to earth via the series circuit of the resistances R5 and R6. The emitter of the transistor T2 is connected to the base of the transistor T3. A capacitor C is connected in parallel to the resistance R6, the output U being connected to the junction of the resistance R5 and the parallel circuit of the resistance R6 and capacitor C.

What is claimed is:

1. An optical device for reading and decoding bars of different reflectivity arranged in accordance with a barcode and adjoining one another, the device comprising:
    an optical scanning device for scanning the bars by a light beam;
    a sensor for receiving the reflected light beam and converting latter into an electrical sensor output signal;
    a transition detector for detecting level transitions of the electrical sensor output signal; and
    a decoding device which decodes the scanned barcode on basis of output signal from the transition detector,
    wherein the sensor output signal is fed to an amplitude averaging device, the output of which is connected to a decision device which controls the decoding device in such a way that reading and decoding of the barcode is carried out a plurality of times when the output signal from the amplitude averaging device is below a predetermined threshold value.

2. The optical device according to claim 1, wherein the values produced by the averaging device are summed and compared with a predetermined threshold value.

3. The optical device according to claim 1, wherein a plurality of ranges of averaged values of the amplitudes of the sensor output signal are defined by threshold values, with a number assigned to each range, said number corresponding to the necessary number of identical decodings for said range.

4. The optical device according to claim 1, wherein the amplitude averaging device comprises a peak detector, the sensor output signal being fed to the input of said peak detector to generate an amplitude signal to be averaged and wherein the output of the peak detector is connected to the input of a low-pass filter.

5. The optical device according to claim 4, wherein the output of the low-pass filter is connected to the input of an analogue-digital converter.

6. The optical device according to claim 1, wherein the amplitude averaging device comprises an operational amplifier, with peak detectors connected to + and − outputs thereof, respectively, and with the outputs of the peak detectors connected to a threshold value circuit, wherein the sensor output signal is fed to the input of an operational amplifier and wherein an amplitude signal to be averaged is produced at the output of the threshold value circuit, which amplitude signal is fed to the input of a low-pass filter.

7. The optical device according to claim 6, wherein the output of the low-pass filter is connected to the input of an analogue-digital converter.

8. An optical device for reading and decoding bars of different reflectivity arranged in accordance with a barcode and adjoining one another, the device comprising:

an optical scanning device for scanning the bars by of light beam;

a sensor for receiving the reflected light beam and converting latter into an electrical signal;

a transition detector for detecting level transitions of the electrical signal; and a decoding device which decodes the scanned barcode on basis of output signals from the transition detector, wherein the sensor output signal is fed to a contrast averaging device, the output of which is connected to a decision device which controls the decoding device in such a way that reading and decoding of the barcode is carried out a plurality of times when the output signal from the contrast averaging device is below a predetermined threshold value.

9. The optical device according to claim 8, wherein the contrast averaging device contains a cascade circuit of a differentiation circuit, peak detector and low-pass filter, and wherein the sensor output signal is fed to the input of the contrast averaging device.

10. The optical device according to claim 9, wherein the output of the low-pass filter is connected to the input of an analogue-digital converter.

11. The optical device according to claim 8, wherein the values produced by the averaging device are summed and compared with the predetermined threshold value.

12. The optical device according to claim 8, wherein a plurality of ranges of averaged values of the contrast of the sensor output signal are defined by threshold values, with a number assigned to each range, said number corresponding to the necessary number of identical decodings for said range.

* * * * *

UNITED STATES PATENT AND TRADEMARK OFFICE
CERTIFICATE OF CORRECTION

PATENT NO. : 6,202,928 B1
DATED : March 20, 2001
INVENTOR(S) : Gerrit Boersma

Page 1 of 1

It is certified that error appears in the above-identified patent and that said Letters Patent is hereby corrected as shown below:

Column 2,
Line 58, "But is" should read -- But if --.

Column 3,
Line 31, "could b" should read -- could be --.
Line 67, after "invention" insert period -- . --

Column 6,
Line 40, "the signals" should read -- The signals --.

Column 7,
Line 59, "than falls" should read -- then falls --.

Column 8,
Line 36, "a--potential" should read -- a - potential --.

Signed and Sealed this

Thirtieth Day of October, 2001

Attest:

*Attesting Officer*

NICHOLAS P. GODICI
*Acting Director of the United States Patent and Trademark Office*